US012762484B2

(12) United States Patent
McGuire et al.

(10) Patent No.: US 12,762,484 B2
(45) Date of Patent: Oct. 13, 2026

(54) MACHINE LEARNING RESEARCH PLATFORM FOR AUTOMATICALLY OPTIMIZING LIFE SCIENCES EXPERIMENTS

(71) Applicant: Benchling, Inc., San Francisco, CA (US)

(72) Inventors: Leah Marie Medvick McGuire, Bainbridge, WA (US); Rebecca Ann Conway, Walnut Creek, CA (US)

(73) Assignee: Benchling, Inc., San Francisco, CA (US)

( * ) Notice: Subject to any disclaimer, the term of this patent is extended or adjusted under 35 U.S.C. 154(b) by 943 days.

(21) Appl. No.: 17/954,180

(22) Filed: Sep. 27, 2022

(65) Prior Publication Data

US 2024/0104437 A1 Mar. 28, 2024

(51) Int. Cl.

| | |
|---|---|
| ***G06N 5/045*** | (2023.01) |
| ***G06F 3/0482*** | (2013.01) |
| ***G06N 20/20*** | (2019.01) |

(52) U.S. Cl.

CPC ........... *G06N 20/20* (2019.01); *G06F 3/0482* (2013.01); *G06N 5/045* (2013.01)

(58) Field of Classification Search

CPC ....... G06N 5/045; G06N 20/20; G06F 3/0482
See application file for complete search history.

(56) References Cited

U.S. PATENT DOCUMENTS

| | | | | |
|---|---|---|---|---|
| 11,727,284 | B2 * | 8/2023 | Le Biannic | G06N 20/00 706/12 |
| 2019/0147076 | A1 | 5/2019 | Yang et al. | |
| 2020/0097847 | A1 * | 3/2020 | Convertino | G06N 7/01 |
| 2021/0049419 | A1 | 2/2021 | Bhaowal et al. | |
| 2021/0057107 | A1 * | 2/2021 | Solomon | G06N 3/0455 |
| 2021/0232920 | A1 * | 7/2021 | Parangi | G06N 3/0455 |
| 2021/0264311 | A1 * | 8/2021 | Mukherjee | G06N 20/20 |
| 2022/0171991 | A1 * | 6/2022 | Das | G06F 18/40 |
| 2022/0328128 | A1 * | 10/2022 | Kok | G06N 20/00 |
| 2023/0325292 | A1 * | 10/2023 | Ardel | G06N 3/0455 |

FOREIGN PATENT DOCUMENTS

| | | |
|---|---|---|
| WO | WO 2020037105 | 2/2020 |

* cited by examiner

*Primary Examiner* — Beau D Spratt
(74) *Attorney, Agent, or Firm* — Fish & Richardson P.C.

(57) ABSTRACT

Methods, systems, and apparatus, including computer programs encoded on a computer storage medium, for generating a user interface presentation using a life sciences research platform. In one aspect, a method includes: receiving input data for multiple life sciences experiments within a research domain, where input data includes a collection of experimental settings for the life sciences experiments, automatically generating multiple machine learning models for the research domain, where each machine learning model predicts a value for an experimental outcome metric, automatically selecting a final machine learning model within the research domain based on performance measures, and generating a user interface presentation of explainability data that explains a contribution of each setting in a collection of settings to the value for the experimental outcome metric predicted by the final machine learning model.

21 Claims, 6 Drawing Sheets

EXAMPLE USER INTERFACE PRESENTATION OF EXPLAINABILITY DATA 400

VISUALIZATION COMPARING SCORES 410

TABLE OF CONTRIBUTION SCORES 420

GENERATING A USER INTERFACE PRESENTATION OF EXPLAINABILITY DATA

MACHINE LEARNING RESEARCH PLATFORM FOR AUTOMATICALLY OPTIMIZING LIFE SCIENCES EXPERIMENTS

BACKGROUND

This specification relates to using machine learning methods to optimize life sciences experiments.

Machine learning generally refers to a wide variety of techniques implemented in hardware, software, or a combination of these, for building predictive models that map an input to a predicted output. The model defines a mathematical transformation between input values and output values predicted by the model. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

In order to train a machine learning model, internal parameters must be tuned using training data. For a particular collection of training data, a learning process manipulates the parameters of the model until the training inputs, when passed through the model, match the training outputs as closely as possible. Then, when an unseen input is encountered, the trained model should ideally be able to generate a predicted output that closely matches the real-world relationship. Modern machine learning models can have many parameters and highly sophisticated architectures with many computational layers, e.g., deep neural networks. Training such models until they converge to a useful state can take significant amounts of computing power, e.g., hundreds of servers, expended for significant periods of time, e.g., hours, days, or weeks.

Collecting training data is relatively straightforward for purely software applications. For example, a machine learning system training a model for predicting whether a proposed electronic transaction is fraudulent can ingest literally billions of training examples from a single day of financial records. However, machine learning has been extremely challenging to use for optimizing life sciences experiments because biological processes, unlike software processes, can themselves be lengthy, complex, and quite costly. Therefore, obtaining training data is many orders of magnitude slower than for pure software applications, many of which can generate training data near instantaneously or in large-scale simulations.

But for many life sciences applications, the processes involved are not easily simulated or might be largely unpredictable. Moreover, using machine learning and life sciences experiments together typically requires finding a person or a team with a rare combination of skill sets in math, software, and statistics as well as life sciences expertise in chemistry or biology. As a result, designing life sciences experiments has conventionally been a plodding and manual process by life sciences experts using trial and error.

SUMMARY

This specification describes a life sciences research platform that can automatically model life sciences experiments within a research domain in order to provide information for optimizing multiple input features, or settings, of life sciences experiments performed in the real-world. This information allows for highly efficient optimization of life sciences experiments by uncovering relationships between input features and a defined experimental outcome metric.

Throughout this specification, an "experiment" generally refers to a process that can be performed in the real-world (e.g., in a laboratory) having multiple user-controllable settings and an associated experimental outcome metric. A "life sciences experiment" generally refers to a biological, chemical, or any other appropriate process that can be performed in the real-world. A "research domain" can generally refer to a specific area of research. As a particular example, life sciences experiments can be, e.g., growing an amount of different bacteria types. In such cases, the research domain associated with the life sciences experiments can be, e.g., growth of bacteria, and the experimental outcome metric can be, e.g., the amount of bacteria grown.

The life sciences research platform can be a distributed cloud-based computing system where multiple users and laboratories can upload and store input data associated with multiple life sciences experiments. The input data can specify, for example, an empirical value for an experimental outcome metric for the life sciences experiments. The input data can further specify, for example, a collection of settings associated with the life sciences experiments, and a respective input value for each setting of the collection of settings. Continuing with the aforementioned example, the collection of settings can include, e.g., temperature, concentration of various gasses, starting materials and their concentrations, and so on.

The life sciences research platform can process input data and automatically select a machine learning model that can predict the empirical value for the experimental outcome metric. For example, the life sciences research platform can evaluate multiple machine learning model types within the research domain based on how well each machine learning model type predicts the empirical value for the experimental outcome metric and select, e.g., best performing machine learning model. Then, the life sciences research platform can generate a user interface presentation of explainability data that explains the contribution of each setting in the collection of settings to the value of the experimental outcome metric predicted by the selected machine learning model.

Throughout this specification "explainability data" can generally refer to data that "explains" the experimental outcome. That is, the explainability data can provide insight into the interactions, influence, and impact of experimental settings to the outcome of the life sciences experiments. The life sciences research platform can provide the explainability data to a user, e.g., by way of a user interface, for use by the user, e.g., in determining the input value of each setting for optimizing the life sciences experiments performed in the real-world.

According to a first aspect, there is provided a computer-implemented method that includes: receiving, from a user of a life sciences research platform including multiple computers, input data for multiple life sciences experiments within a research domain. The input data includes, for each life sciences experiment: (i) a collection of settings associated with the life sciences experiments, (ii) a respective input value for each setting of the collection of settings, and (iii) a respective empirical value for an experimental outcome metric. The method further includes automatically generating, by the life sciences research platform, multiple machine learning models for the research domain, where each machine learning model is configured to predict a value for the experimental outcome metric. This can include, for each machine learning model within the research domain: training a candidate machine learning model from the collection of settings associated with the life sciences experiments, and determining a performance measure for the candidate machine learning model based on how well the candidate machine learning model predicts the respective empirical value for the experimental outcome metric. The method further includes automatically selecting, by the life sciences research platform, a final machine learning model from multiple machine learning models within the research domain based on the performance measures of the candidate machine learning models, and generating, by the life sciences research platform, a user interface presentation of explainability data that explains a contribution of each setting in the collection of settings to the value for the experimental outcome metric predicted by the final machine learning model.

In some implementations, multiple machine learning models for the research domain include different machine learning model types.

In some implementations, multiple machine learning model types include one or more of: linear regression models, logistic regression models, Bayes classifier models, random classifier models, decision tree models, and neural network models.

In some implementations, multiple machine learning models for the research domain are selected from a model library that is specific to the research domain specified in the input data.

In some implementations, the method further includes: receiving new input data for a proposed life sciences experiment within the research domain that includes a respective new input value for each setting of the collection of settings, using the final machine learning model and the respective new input value for each setting in the collection of settings to predict a new value for the experimental outcome metric, and presenting the new value for the experimental outcome metric in the user interface presentation of the life sciences research platform.

In some implementations, automatically generating, by the life sciences research platform, multiple machine learning models for the research domain further includes: obtaining multiple hyperparameter settings for the research domain specified in the input data and, for each machine learning model of multiple machine learning models within the research domain: training the candidate machine learning model from the collection of settings associated with each life sciences experiment and the hyperparameter settings to predict the value for the experimental outcome metric.

In some implementations, the input data for multiple life sciences experiments within the research domain represents results obtained from real-world life sciences experiments.

In some implementations, the method further includes: receiving, from one or more other users of the life sciences research platform, input data for multiple life sciences experiments within the research domain, and automatically selecting the final machine learning model multiple machine learning models within the research domain for each of the one or more other users.

In some implementations, the input data further includes one or more constraints associated with the life sciences experiments, and automatically generating the machine learning models for the research domain further includes, for each machine learning model of multiple machine learning models within the research domain: training the candidate machine learning model from the collection of settings associated with each life sciences experiment and the one or more constraints.

In some implementations, automatically selecting the final machine learning model from multiple machine learning models within the research domain based on the performance measures of the candidate machine learning models includes: automatically selecting the candidate machine learning model from multiple machine learning models having the highest performance measure.

In some implementations, receiving, from the user of the life sciences research platform, input data for multiple life sciences experiments within the research domain, includes: generating, in the user interface presentation of the life sciences research platform, a table for each life sciences experiment, where each table specifies: (i) an identification number of the life sciences experiment, and (ii) the empirical value of the experimental outcome metric for the life sciences experiment.

In some implementations, generating, in the user interface presentation of the life sciences research platform, the table for each life sciences experiment, includes: presenting, in the user interface presentation of the life sciences research platform, a column user interface control, and receiving, from the user of the life sciences research platform, a column selection through the column user interface control.

In some implementations, generating, by the life sciences research platform, the user interface presentation of explainability data that explains the contribution of each setting in the collection of settings to the value for the experimental outcome metric predicted by the final machine learning model includes: determining, for each setting in the collection of settings, a contribution score that characterizes a contribution of the setting to the value for the experimental outcome metric, and generating, in the user interface presentation, a visualization that compares the respective contribution scores of the collection of settings.

In some implementations, the method further includes: generating, by the life sciences research platform and for each setting in the collection of settings, a visualization that compares different input values for the setting and respective contribution scores.

According to a second aspect, there is provided a system including: one or more computers; and one or more storage devices communicatively coupled to the one or more computers, where the one or more storage devices store instructions that, when executed by the one or more computers, cause the one or more computers to perform the operations of the respective method of any preceding aspect.

According to a third aspect, there are provided one or more non-transitory computer storage media storing instructions that when executed by one or more computers cause the one or more computers to perform the operations of the respective method of any preceding aspect.

Particular embodiments of the subject matter described in this specification can be implemented so as to realize one or more of the following advantages.

The life sciences research platform described in this specification can automatically generate multiple machine learning models for a research domain associated with life sciences experiments and automatically select a final (e.g., best performing) machine learning model for the research domain. The life sciences research platform can perform this process automatically based on input data that can characterize, e.g., real-world life sciences experiments. In this manner, the life sciences research platform can intelligently provide machine learning expertise that may not otherwise be directly available to users and researchers in the domain of life sciences experiments. Furthermore, the life sciences research platform can encapsulate scientific expertise in a variety of different research domains and make that expertise available to others. The life sciences research platform can be universally accessible to, and usable by, a variety of different entities and data sources, without the need for machine learning expertise, adaptation, or redesign.

The life sciences research platform described in this specification can generate user interface presentations that efficiently present explainability data that explains a contribution of each setting associated with the life sciences experiments to a predicted value of an experimental outcome metric. This explainability data can uncover hidden relationships between different experimental settings and provide invaluable insight into their interactions in the real-world, e.g., in a laboratory. Therefore, the life sciences research platform can facilitate highly efficient optimization of life sciences experiments that would otherwise be prohibitively costly and time-consuming to perform in the real-world. Furthermore, the life sciences research platform can present the explainability data in an easy-to-understand way, thereby facilitating much more accessible and efficient interpretability of the data. Moreover, the user interface presentation provides the ability to query potential experimental setups against the final machine learning model in order to evaluate their success before the experiments applying the experimental setups are performed in the real-world. The research platform can also generate error estimates for potential experimental setups to help users of the platform gauge their accuracy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
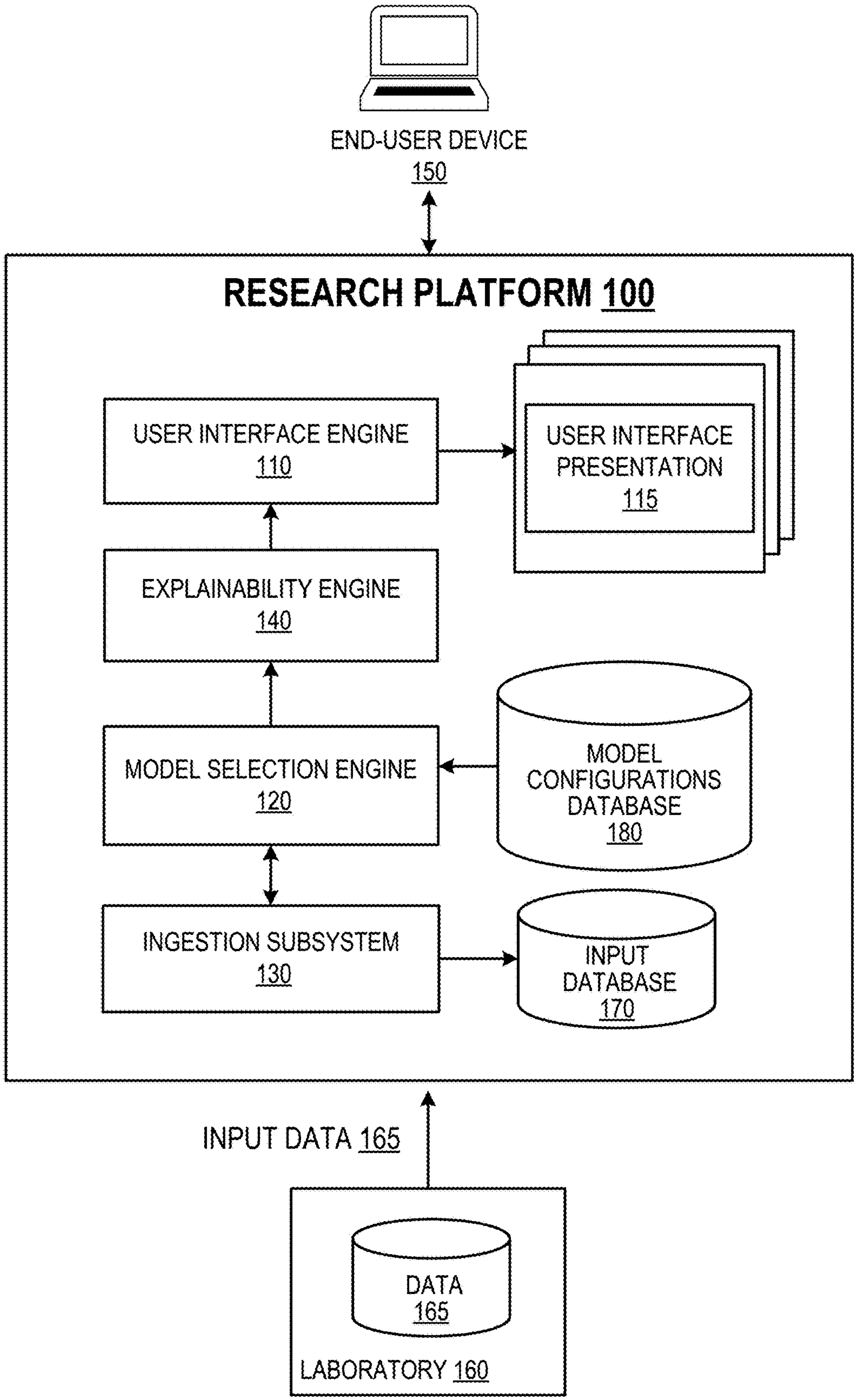
FIG. 1 is a block diagram of an example life sciences research platform.

FIG. 1 is a block diagram of an example life sciences research platform 100 that can generate a user interface presentation 115 of explainability data. The life sciences research platform 100 is an example of a system implemented as computer programs on one or more computers in one or more locations in which the systems, components, and techniques described below are implemented.

The life sciences research platform 100 can receive input data 165 for multiple life sciences experiments within a research domain and generate the user interface presentation 115 of explainability data. The explainability data can provide an insight into the relationships between different settings and their influence on an experimental outcome associated with the life sciences experiments within the research domain. The explainability data is described in more detail below with reference to FIG. 4 and FIG. 5.

As described in more detail below with reference to FIG. 2, the input data 165 can characterize multiple life sciences experiments within the research domain, e.g., real-world experiments that have been performed in the laboratory 160. In some cases, input data 165 can be "historical" data, e.g., can characterize multiple life sciences experiments performed in the past. Generally, each life sciences experiment can be performed under certain conditions with multiple user-specified settings, e.g., temperature, pressure, time, speed, concentrations of materials and gasses, and any other appropriate settings. In some cases, the collection of settings can depend on the research domain associated with the life sciences experiments, e.g., the collection of settings for bacterial growth experiments can be different from the collection of settings for organic chemistry experiments.

The life sciences research platform 100 can receive the input data 165 that includes, for each life sciences experiment: (i) the collection of settings associated with the life sciences experiments, (ii) a respective input value for each setting of the collection of settings, and (iii) a respective empirical value for an experimental outcome metric. Generally, the collection of settings can include any appropriate number and type of settings that can be used to perform real-world life sciences experiments.

In some cases, each of the life sciences experiments within the research domain can be associated with the same collection of settings, but different input values for one or more settings of the collection of settings. For example, for a first life sciences experiment and a second life sciences experiment within the same research domain, the collection of settings can include, e.g., different input values for the temperature setting, but the same input values for the pressure setting. Furthermore, in some cases, one or more life sciences experiments within the same research domain can be associated with different empirical values for the experimental outcome metric. For example, for bacterial growth experiments, the experimental outcome metric can be, e.g., an amount of grown bacteria, and one or more life sciences experiments within this research domain can be associated with different values of the experimental outcome metric, e.g., different amounts of grown bacteria.

The life sciences research platform 100 can be a distributed cloud-based computing system that can process the input data 165 characterizing multiple life sciences experiments within the research domain and generate the user interface presentation 115 of explainability data. The research platform 100 can do this by using: (i) a user interface engine 110, (ii) an explainability engine 140, (iii) a model selection engine 120, (iv) a model configurations database 180, (v) an ingestion subsystem 130, and (vi) an input database 170, each of which is described in more detail next.

The ingestion subsystem 130 can be configured to receive the input data 165 and store it in the input database 170. Generally, the input database 170 can store any appropriate number of input datasets in any appropriate format. The ingestion subsystem 130 can receive the input data 165 from, e.g., a life sciences research laboratory 160, a user of an end-user device 150, or in any other appropriate manner. As a particular example, the user of the end-user device 150 can provide the input data 165 by way of an input into a user interface (e.g., a graphical user interface, GUI), or an application programming interface (API), made available by the life sciences research platform 100 or the end-user device 150. As another particular example, the ingestion subsystem 130 can receive the input data 165 through a network, which can be a local area network (LAN), a wide area network (WAN), the Internet, or a combination thereof. In some cases, the life sciences research platform 100 can generate in the user interface presentation 115 a presentation of the input data 165. This is described in more detail below with reference to FIG. 2.

The ingestion subsystem 130 can be configured to receive the input data 165 and perform one or more tasks associated with the input data 165 before storing it in the input database 170. In some cases, the ingestion subsystem 130 can include one or more software programs executable within the life sciences research platform 100 that can perform the tasks associated with the input data 165. For example, the ingestion subsystem 130 can be configured to clean, join, extract, aggregate, transform, filter, analyze, or perform any other appropriate operation on the input data 165. In some cases, a user of the life sciences research platform 100 can provide a user input through the API made available by the research platform 100 or the end-user device 150 that specifies the operations to be performed on the input data 165. In response to user input, the ingestion subsystem 130 can process the input data 165 to perform the operations specified in the user input and store the processed input data 165 in the input database 170. The life sciences research platform 100 can make processed input data 165 accessible from any appropriate device (e.g., the end-user device 150). An example user interface presentation of the input data 165 is described in more detail below with reference to FIG. 2.

The model selection engine 120 can be configured to process the input data 165 stored in the input database 170 and automatically generate multiple machine learning models for the research domain. Each machine learning model can be configured to predict a value for the experimental outcome metric, e.g., the empirical value for the experimental outcome metric specified in the input data 165. In some cases, the model selection engine 120 can generate the machine learning models for the research domain by selecting the models from a model library in the model database 180 that is specific to the research domain. For example, the model database 180 can include multiple model libraries, each specific to a particular research domain, and the model selection engine 120 can select the machine learning models from an appropriate model library of the model database 180 based on the research domain specified in the input data 165. Generally, model database 180 can include any appropriate number of machine learning models and model libraries for any appropriate number and types of research domains.

In some cases, the model selection engine 120 can automatically generate different machine learning model types for the research domain. Generally, the model selection engine 120 can generate and/or store an explicit mapping (e.g., mapping data) between a variety of different research domains of life sciences experiments and multiple machine learning models for a respective research domain. In some cases, the machine learning models can be "applicable" for a particular research domain if they are configured to generate an output that is predictive of, or relevant to, the experimental outcome metric for the life sciences experiments in that research domain. In some cases, the mapping between the machine learning models and the research domain can be determined based on, e.g., previous life sciences experiments and/or historical data in a variety of different research domains. By automatically generating different machine learning models in this manner, the life sciences research platform 100 is able to leverage the collective experiential power of all its users and input data for life sciences experiments in a variety of different research domains to benefit entities that are interested in specific research domains of life sciences experiments.

The machine learning model types can include one or more of: linear regression models, logistic regression models, Bayes classifier models, random classifier models, decision tree models, neural network models, and any other appropriate type of machine learning models. In some cases, the model selection engine 120 can generate machine learning models for the research domain having different architectures and/or configurations. For example, one or more machine learning models for the research domain can be neural networks having different neural network configurations, e.g., having any appropriate types of neural network layers (e.g., fully-connected layers, convolutional layers, attention layers, etc.) in any appropriate numbers (e.g., 1 layer, 5, layers, 10 layers, etc.) and connected in any appropriate configuration, e.g., as a linear sequence of layers.

In some cases, the model selection engine 120 can be configured according to an "AutoML" pipeline, e.g., the Automatic Machine Learning pipeline. In some cases, the model selection engine 120 can be configured to generate multiple machine learning models for the research domain based on hyperparameter settings. For example, the input data 165 can specify multiple hyperparameter settings for the research domain, and the model selection engine 120 can use the hyperparameter settings to generate the machine learning models for the research domain. The operations performed by the model selection engine 120 are described in more detail below with reference to FIG. 3.

After automatically generating multiple machine learning models for the research domain specified in the input data 165, the model selection engine 120 can evaluate the machine learning models and automatically select a final machine learning model for the research domain. For example, the model selection engine 120 can use the collection of settings associated with the life sciences experiments to evaluate how well each machine learning model predicts the value for the experimental outcome metric specified in the input data 165. In some cases, the model selection engine 120 can select the best performing machine learning model, e.g., the machine learning model that most accurately predicts the value for the experimental outcome metric, as the final machine learning model. This process is described in more detail below with reference to FIG. 3.

The explainability engine 140 can use the final machine learning model and the predicted value for the experimental outcome metric generated by the final machine learning model, to generate explainability data that explains a contribution of each setting in the collection of settings to the predicted value for the experimental outcome metric. For example, the explainability engine 140 can determine, for each setting in the collection of settings, a contribution score that characterizes a contribution of the setting to the value for the experimental outcome metric predicted by the final machine learning model. Generally, the contribution score can be, e.g., any appropriate numerical value. In some cases, the contribution score for a setting can compare the impact of the setting on the prediction generated by the machine learning model relative to the impact of the other settings on the prediction generated by the final machine learning model. As a particular example, the contribution score can be, e.g., a SHAP value determined by the explainability engine 140 using the SHAP (SHapley Additive exPlanations) methodology. However, the explainability engine 140 can generally use any appropriate technique to determine the contribution score for each setting, e.g., any appropriate feature importance technique that can determine an impact of each setting on the prediction generated by the final machine learning model. In this manner, the explainability engine 140 can generate explainability data for use in optimizing multiple settings of life sciences experiments performed in the real-world.

The life sciences research platform 100 further includes the user interface engine 110 that is configured to generate the user interface presentation 115 of the explainability data that explains the contribution of each setting in the collection of settings to the value for the experimental outcome metric predicted by the final machine learning model. The user interface engine 110 can generate the user interface presentation 115 that presents, e.g., for each setting in the collection of settings, the contribution score generated by the explainability engine 140. Example user interface presentations of explainability data are described in more detail below with reference to FIG. 4 and FIG. 5.

The life sciences research platform 100 can provide the user interface presentation 115 of explainability data for display to a user of the end-user device 150. Generally, the end-user device 150 can be an electronic device that is capable of requesting and receiving content over the network described above, e.g., the Internet. The end-user device 150 can include any client computing device such as a laptop/notebook computer, wireless data port, smart phone, personal data assistant (PDA), tablet computing device, one or more processors within these devices, or any other suitable processing device that can send and receive data over the network. For example, the end-user device 150 can include, e.g., a computer that includes an input device, such as a keypad, touch screen, or other device that can accept user information, and an output device that conveys information, including digital data, visual information, and/or the user interface presentation 115. The end-user 150 can include one or more client applications. A client application is any type of application that allows the end-user device 150 to request and view content on a respective client device. In some implementations, a client application can use parameters, metadata, and other information received, e.g., at launch, to access a particular set of data from the bioinformatics platform 100.

As described in more detail below with reference to FIG. 4 and FIG. 5, a user of the end-user device 150 can view the user interface presentation 115 of explainability data and use the explainability data to optimize real-world life sciences experiments within the research domain. For example, the explainability data can indicate which setting from the collection of settings has the largest contribution to the predicted value for the experimental outcome metric generated by the final machine learning model, when compared to the other settings in the collection of settings. Furthermore, explainability data can indicate how the contribution to the prediction for the experimental outcome metric varies with different input values for a particular setting from the collection of settings. The user can view explainability data and in the user interface presentation 115 and make decisions regarding input values for the settings of real-world life sciences experiments.

In some cases, after the research platform 100 selects the final machine learning model, a user of the research platform 100 can provide new input data that includes new input values for the collection of settings associated with the life sciences experiments in the research domain. For example, the user can provide an input through the API made available by the platform 100 that specifies new input values. In some cases, new input values may not necessarily correspond to the life sciences experiments already performed in the real-world. The research platform 100 can use new input data and the final machine learning model to automatically generate new explainability data that explains a contribution of each setting in the collection of settings to the value for the experimental outcome metric predicted by the final machine learning model. Accordingly, the life sciences research platform can automatically generate new insights regarding life sciences experiments that would otherwise only be possible by performing the experiments in the real-world.

In this manner, the life sciences research platform 100 can provide an insight into the interactions, influence, and impact of experimental settings to the outcome of the life sciences experiments. Therefore, the life sciences research platform 100 can facilitate a highly efficient optimization of life sciences experiments at a significantly lower cost, where such optimization may otherwise be extremely costly and time consuming to perform in the laboratory.

Furthermore, the life sciences research platform can intelligently provide machine learning expertise that may not otherwise be directly available to users and researchers in the domain of life sciences experiments.

An example user interface presentation of input data 165 generated by the life sciences research platform 100 is described in more detail next.

Figure 2:
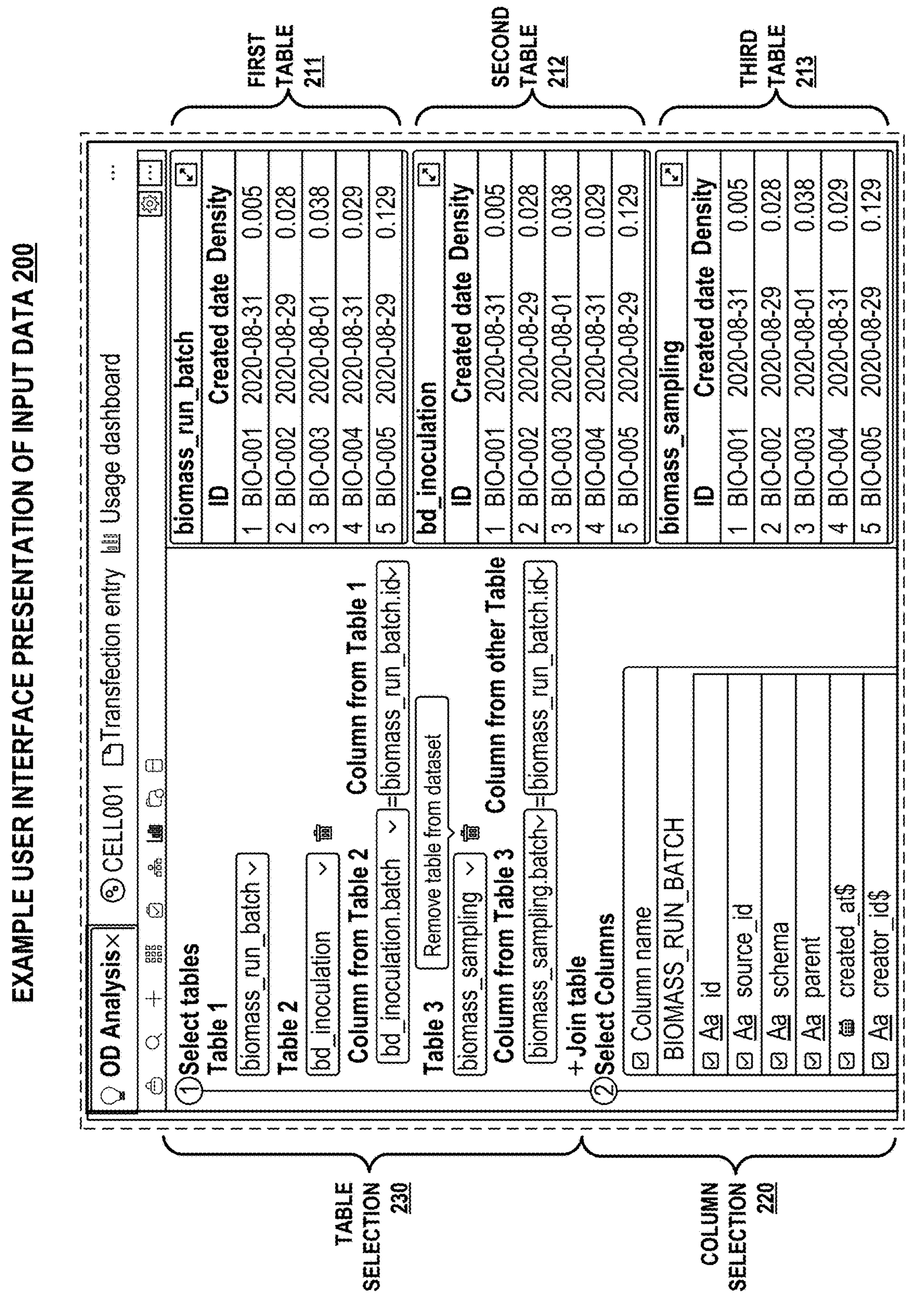
FIG. 2 illustrates an example user interface presentation of input data generated by a life sciences research platform.

FIG. 2 illustrates an example user interface presentation 200 of input data generated by a life sciences research platform (e.g., the life sciences research platform 100 in FIG. 1). As described above with reference to FIG. 1, the life sciences research platform can receive input data for multiple life sciences experiments. A user interface engine (e.g., the user interface engine 110 in FIG. 1) of the life sciences research platform can generate the user interface presentation 200 of the input data.

The input data can characterize multiple life sciences experiments within a research domain and can include, for each life sciences experiment: (i) a collection of settings associated with the life sciences experiments, (ii) a respective input value for each setting of the collection of settings, and (iii) a respective empirical value for an experimental outcome metric. In some cases, the input data can represent historical data in one or more different formats characterizing multiple life sciences experiments performed in the past, e.g., before the input data is ingested into the research platform. By interacting with one or more user interface controls in the user interface presentation 200 (e.g., user interface controls described in more detail below), users of the life science research platform can easily ingest into the research platform multiple datasets of historical data and efficiently organize them through user input. In this manner, the life sciences research platform facilitates easy and efficient organization of large amounts of historical data, even if such data is in various different formats and/or is incomplete.

The user interface engine can generate, in the user interface presentation 200, a table for each life sciences experiment. For example, as illustrated in FIG. 2, the input data can include three different life sciences experiments in the research domain, e.g., "biomass_run_batch," "bd_inoculation," and "biomass_sampling" and a dataset corresponding to each run of the respective life sciences experiment, e.g., 5 runs of each life sciences experiment indicated by identification numbers (e.g., "BIO-001," "BIO-002," etc.) in the tables.

As illustrated in FIG. 2, the experimental outcome metric for each life sciences experiment is a "density." The user interface engine can generate, e.g., a first table 211 for the life sciences experiment "biomass_run_batch" that includes a row for each run of the experiment and a respective empirical value for the experimental outcome metric, e.g., the density. The user interface engine can similarly generate a second table 212 for the "bd_inoculation" life sciences experiment and a third table 213 for the "biomass_sampling" life sciences experiment. Generally, the user interface engine can generate the user interface presentation 200 for any number of life sciences experiments, e.g., 1 experiment, 5 experiments, 10 experiments, 50 experiments, or any other appropriate number of life sciences experiments. In some cases, a user of the life sciences research platform can interact with one or more user interface controls in the user interface presentation 200 (e.g., a table selection user interface control 230) to select (or remove) different datasets included in the input data and generate (or remove) corresponding tables in the user interface presentation 200. In some cases, the user can also exchange different columns or rows between multiple tables in the user interface presentation 200.

In some implementations, the user interface engine can present, in the user interface presentation 200, a column user interface control 220. A user of the life sciences research platform can interact with the column user interface control to select the columns to be presented in each of the tables in the user interface presentation 200. For example, each column can correspond to, e.g., each setting in the collection of settings associated with the life sciences experiments, the date of creation of the dataset or the date of the life sciences experiment, or any other appropriate parameter. The user interface engine can automatically populate the columns with input values based on the input data.

As described above with reference to FIG. 1, the life sciences research platform can process the input data for multiple life sciences experiments in the research domain, e.g., the input data presented in the user interface presentation 200, to automatically generate multiple machine learning models for the research domain. An example dataflow for automatically generating multiple machine learning models by the life sciences research platform is described in more detail next.

Figure 3:
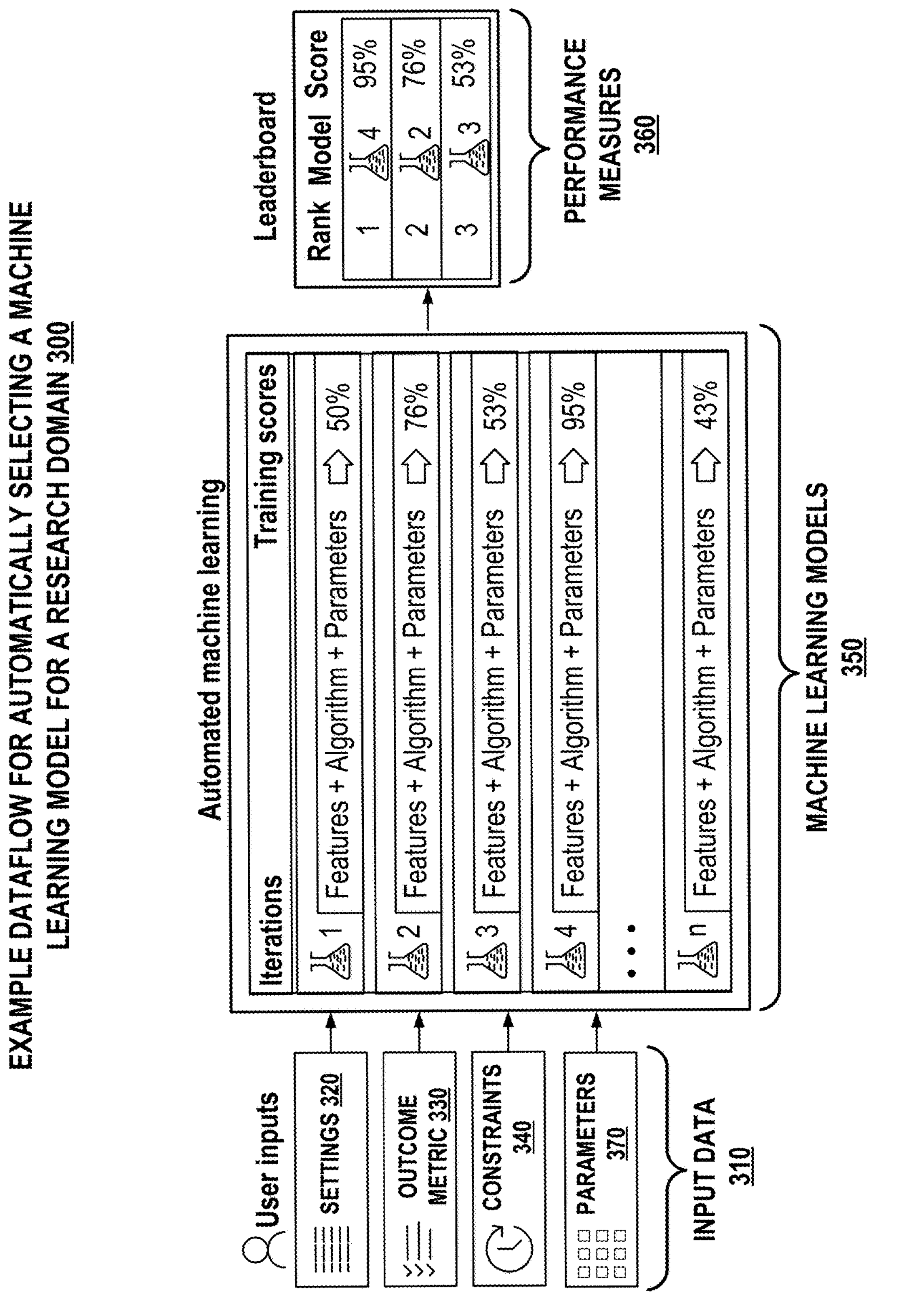
FIG. 3 illustrates an example data flow for automatically selecting a final machine learning model for a research domain by a life sciences research platform.

FIG. 3 illustrates an example data flow 300 for automatically selecting a final machine learning model for a research domain by a life sciences research platform (e.g., the life sciences research platform 100 in FIG. 1).

As described above with reference to FIG. 1, the life sciences research platform can receive input data 310 for multiple life sciences experiments in the research domain, the input data 310 including: (i) a collection of settings 320 associated with the life sciences experiments, (ii) a respective input value for each setting of the collection of settings 320, and (iii) a respective empirical value for an experimental outcome metric 340. In some cases, the input data 310 can further include one or more constraints 340 associated with the life sciences experiments, e.g., a time period within which the life sciences experiments need to be completed in the real-world, a cost constraint, or any other appropriate constraint.

The life sciences research platform can use the input data 310 to automatically generate multiple machine learning models 350 for the research domain. Each machine learning model can have a respective set of machine learning model parameters and can be configured to predict a value for the experimental outcome metric 330. Generally, each machine learning model can have any appropriate architecture that enables it to perform its prescribed function. In some cases, the research platform can select the machine learning models for the research domain from a model library that is specific to the research domain. After generating multiple machine learning models 350 for the research domain, the research platform can evaluate the machine learning models 350 to select a final machine learning model for the research domain. This process is described in more detail next.

The life sciences research platform can evaluate each machine learning model for the research domain by training each machine learning model using a machine learning technique. The machine learning technique can be any appropriate type of technique, e.g., supervised learning technique, unsupervised learning technique, or any other appropriate technique. The research platform can train each machine learning model on a set of training data over multiple training iterations. The training data can include multiple training examples, where each example specifies: (i) a training input and (ii) a corresponding training (e.g., target) output that should be generated by the machine learning model by processing the training input. The training input can include, e.g., respective input values for one or more settings 320 in the collection of settings associated with a particular life sciences experiment and, optionally, the one or more constraints 340. The target output can include, e.g., the empirical value of the experimental outcome metric 330 associated with the life sciences experiment.

As a particular example, the research platform can train each machine learning model over multiple training iterations using a stochastic gradient descent optimization technique. In this example, at each training iteration, the research sample can sample a "batch" (set) of one or more training examples from the training data, and process the training inputs specified by the training examples to generate corresponding network outputs. The research platform can evaluate an objective function that measures a similarity between: (i) the target outputs specified by the training examples, and (ii) the network outputs generated by machine learning model, e.g., a cross-entropy objective function, a squared-error objective function, or any other appropriate objective function. The research platform can determine gradients of the objective function, e.g., using backpropagation techniques, and update the parameter values of the machine learning model using the gradients, e.g., using any appropriate gradient descent optimization algorithm, e.g., RMSprop or Adam. In some cases, the research platform can use different training methods to train one or more machine learning models of multiple machine learning models.

After a last training iteration in the sequence of training iterations, the research platform can determine a performance measure 360 for each machine learning model based on how well the machine learning model predicts the respective empirical value for the experimental outcome metric 330. In some cases, the research platform can determine the performance measure 360 for each machine learning model on a set of validation data, e.g., data that is reserved for evaluating the performance of the machine learning model (e.g., by not training the machine learning model on the validation data). The performance measure can be, e.g., percentage accuracy of the predicted value of the experimental outcome metric 330 relative to the empirical value of the experimental outcome metric 330 specified in the input data 310. Generally, the performance measure 330 can be any appropriate numerical value.

In some implementations, in evaluating each machine learning model, the research platform can take other factors into consideration in addition to the performance measure 330 of the machine learning model. The research platform can additionally determine a constraint satisfaction measure for each life sciences experiment based on the one or more constraints 340 specified in the input data and the collection of settings 320 associated with the life sciences experiment. For example, the research platform can determine the constraint satisfaction measure based on the predicted time/cost associated with each life sciences experiment if the experiment was performed in the real-world using the input values of the collection of settings associated with the life sciences experiment. The life sciences research platform can determine a quality measure for each machine learning model as a linear combination of: (i) the performance measure 330 of the machine learning model, and (ii) the constraint satisfaction measure associated with the collection of settings used to train the machine learning model.

In some implementations, the research platform can evaluate each machine learning model 350 for the research domain based on hyperparameter settings. For example, the input data 310 can further include hyperparameter settings 370 for the research domain associated with the life sciences experiments, and the research platform can use the hyperparameter settings 370 to train each machine learning model by, e.g., setting the initial machine learning model parameter values to the values specified by the hyperparameter settings 370 and then training the machine learning model in a similar way as described above.

After evaluating each machine learning model, the research platform can automatically select the final machine learning model using the performance measures 360. For example, the research platform can select the machine learning model having, e.g., the highest performance measure. As illustrated in FIG. 3, the research platform can select, e.g., the machine learning model having the performance measure of 95% accuracy as the final machine learning model. After selecting the final machine learning model, the research platform can automatically generate a user interface presentation of explainability data that explains a contribution of each setting in the collection of settings 320 to the value for the experimental outcome metric 330 predicted by the final machine learning model.

Example user interface presentations of explainability data generated by the life sciences research platform are described in more detail below with reference to FIG. 4 and FIG. 5.

Figure 4:
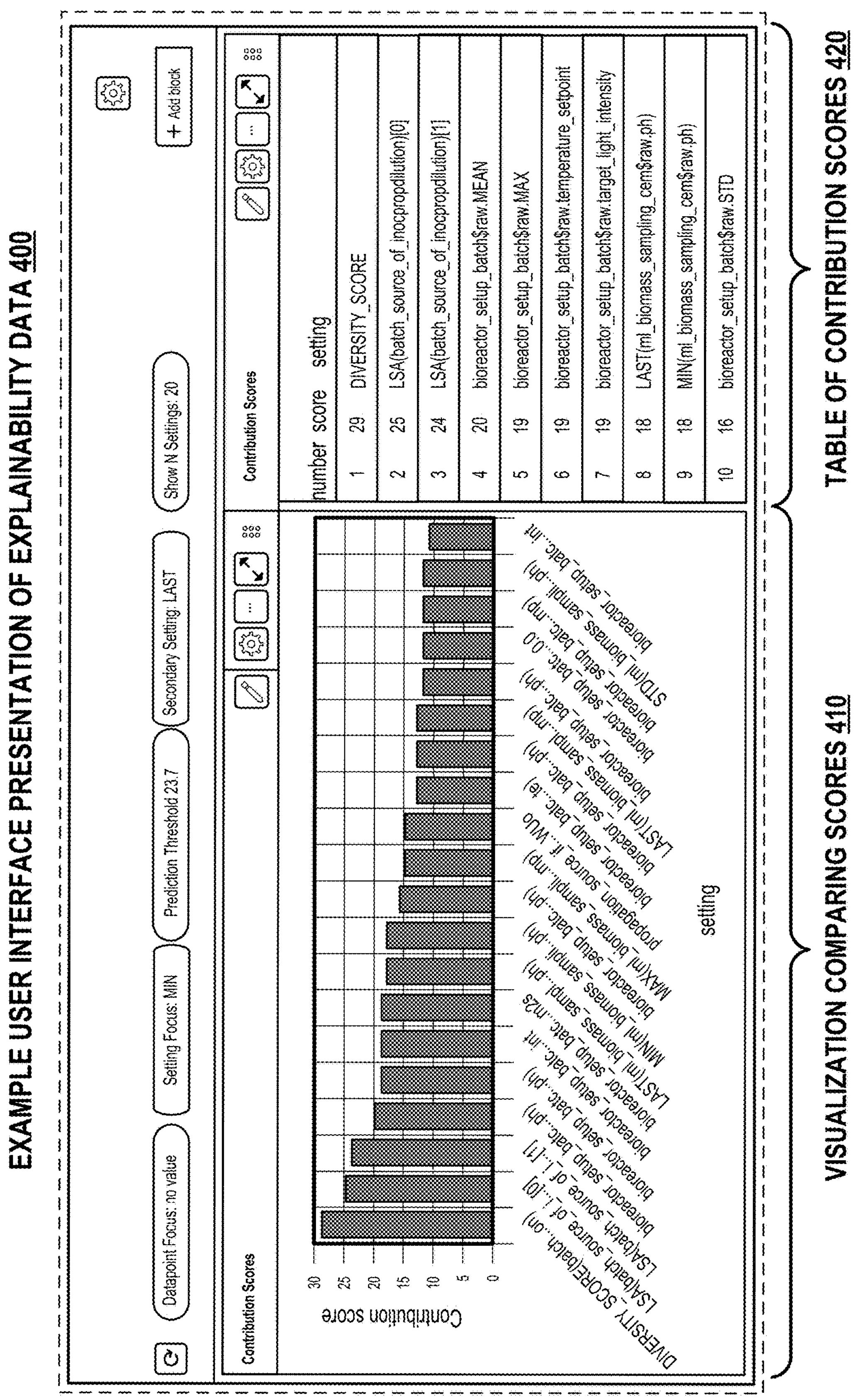
FIG. 4 illustrates an example user interface presentation of explainability data generated by a life sciences research platform.

FIG. 4 illustrates an example user interface presentation 400 of explainability data generated by a life sciences research platform (e.g., the life sciences research platform 100 in FIG. 1). As described above with reference to FIG. 1, the life sciences research platform can use a final machine learning model and a value for an experimental outcome metric predicted by the final machine learning model to generate explainability data that explains a contribution of each setting in a collection of settings associated with the life sciences experiments to the predicted value for the experimental outcome metric. Explainability data can include, e.g., a contribution score for each setting that characterizes a contribution of the setting to the predicted value for the experimental outcome metric. Generally, the life sciences research platform can generate the contribution score in any appropriate manner, e.g., using the SHAP (SHapley Additive exPlanations) methodology or any other appropriate feature importance technique.

The life sciences research platform can generate a table 420 in the user interface presentation 400 that specifies each setting in the collection of settings associated with the life sciences experiments and a respective contribution score for the setting determined by the life sciences research platform. As illustrated in FIG. 4, the table 420 indicates that the setting "DIVERSITY SCORE" has the highest contribution value, e.g., 29, out of the other settings in the collection of settings. In some cases, the life sciences research platform can generate the table 420 that includes only a number of top-contributing settings from the collection of settings. For example, if the collection of settings includes, e.g., 100 settings, the life sciences research platform can generate the table 420 only for, e.g., 10 settings having the highest contribution scores. In some cases, the user interface presentation 400 can include one or more user interface controls that a user of the research platform can interact with to, e.g., select the number of settings to be displayed in the user interface presentation 400, select a particular setting from the collection of settings, search the table 420 for a particular setting, or perform any other appropriate operation.

In some cases, the life sciences research platform can generate a visualization 410 that compares the contribution scores of the settings associated with the life sciences experiments. As illustrated in FIG. 4, the visualization 410 can be, e.g., a bar chart that specifies each setting in the collection of settings on the x-axis and a respective contribution score associated with each setting on the y-axis. In this manner, the life sciences research platform can present the explainability data in the user interface presentation 400 to a user of the research platforms who can view the explainability data and make decisions regarding real-world life sciences experiments.

Figure 5:
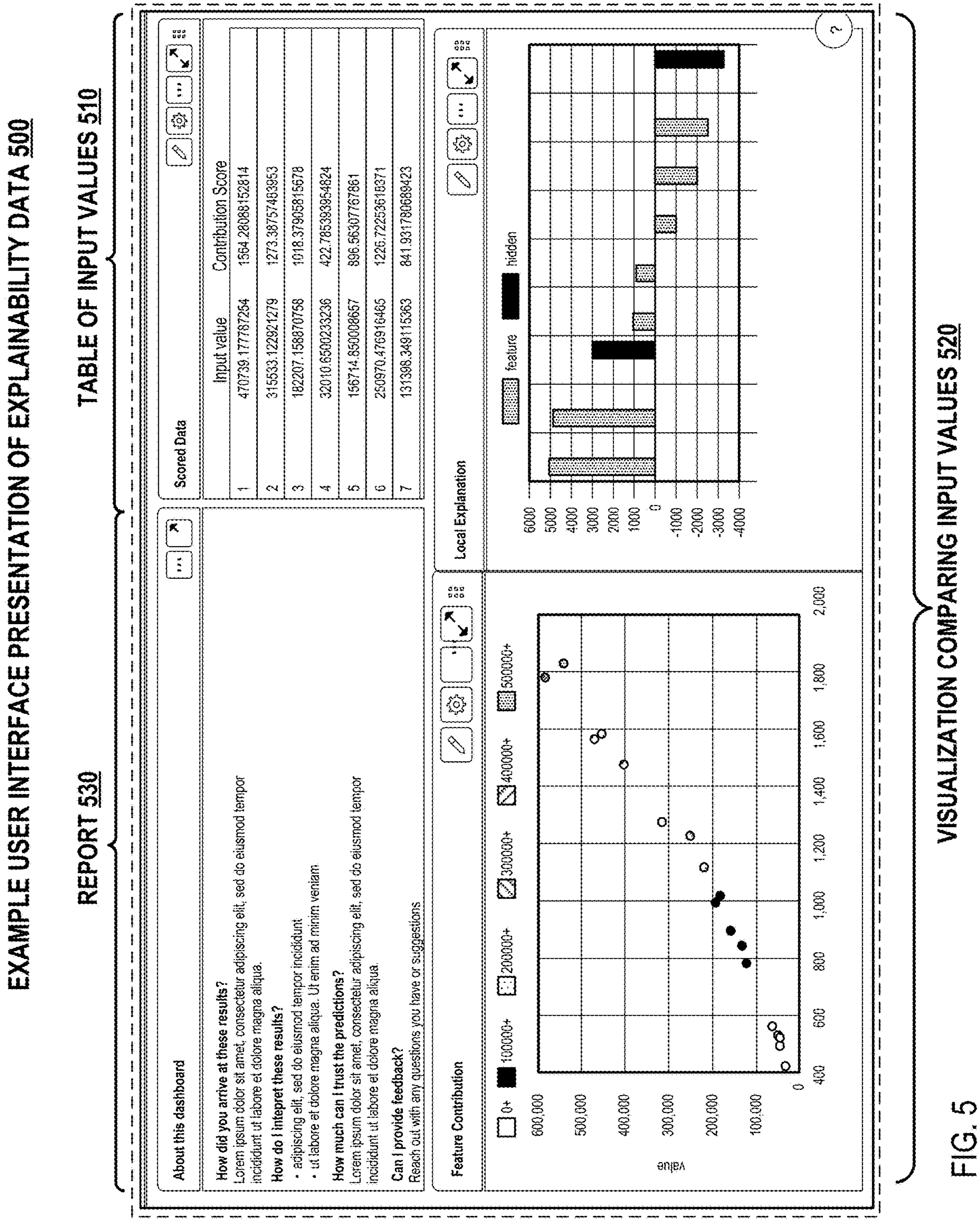
FIG. 5 illustrates another example of a user interface presentation of explainability data generated by a life sciences research platform.

FIG. 5 illustrates another example of a user interface presentation 500 of explainability data generated by a life sciences research platform (e.g., the life sciences research platform 100 in FIG. 1).

The life sciences research platform can generate a table 510 in the user interface presentation 500 that specifies different input values for a particular setting in a collection of settings associated with the life sciences experiments and a respective contribution score associated with each input value for the setting that characterizes a contribution of the input value for the setting to the value for the experimental outcome metric predicted by a final machine learning model.

The life sciences research platform can generate a visualization 520 that compares different input values for the setting and associated contribution scores. The visualization 520 can be, e.g., a graph that specifies the contribution scores on the x-axis and the respective input values for the setting on the y-axis. The visualization 520 can further include, e.g., a waterfall diagram that illustrates local explanations for the input values of the setting. The waterfall diagram can represent, e.g., contributions of different experimental settings, or contributions of different input values of the same experimental setting, to the prediction generated by the machine learning model.

The user interface presentations 400 in FIGS. 4 and 500 in FIG. 5 can allow users of the life sciences research platform to query potential (e.g., planned) experimental setups against the final machine learning model in order to evaluate their success before the life sciences experiments are performed in the real-world. For example, the life sciences research platform can receive, from a user, input data for life sciences experiments that specifies, e.g., different input values for the collection of settings, different types of settings in the collection of settings, different types of experimental outcome metrics and experimental constraints, and any other appropriate parameters. Various combinations of these parameters can represent different experimental setups of life sciences experiments that can be performed in the real-world. The life sciences research platform can use the final machine learning model to process the input data and generate respective predictions for the experimental outcome metric associated with different experimental setups. Then, the life sciences research platform can generate a measure of accuracy (or a performance measure as described above) associated with each experimental setup and display it in the user interface presentations 400, 500. The user of the life sciences research platform can view the user interface presentations 400, 500 and assess the success of each experimental setup before the experiment is performed in the real-world. In this manner, the life sciences research platform can facilitate a highly efficient optimization of life sciences experiments even before such experiments are performed in a laboratory.

In some cases, the life sciences research platform can automatically generate a report 530 that provides insights into the explainability data presented in the user interface presentation 500. The report can include text that indicates, e.g., key findings from the explainability data.

An example process for generating the user interface presentation of explainability data, e.g., presentation 400 in FIG. 4 and presentation 500 in FIG. 5, is described in more detail next.

Figure 6:
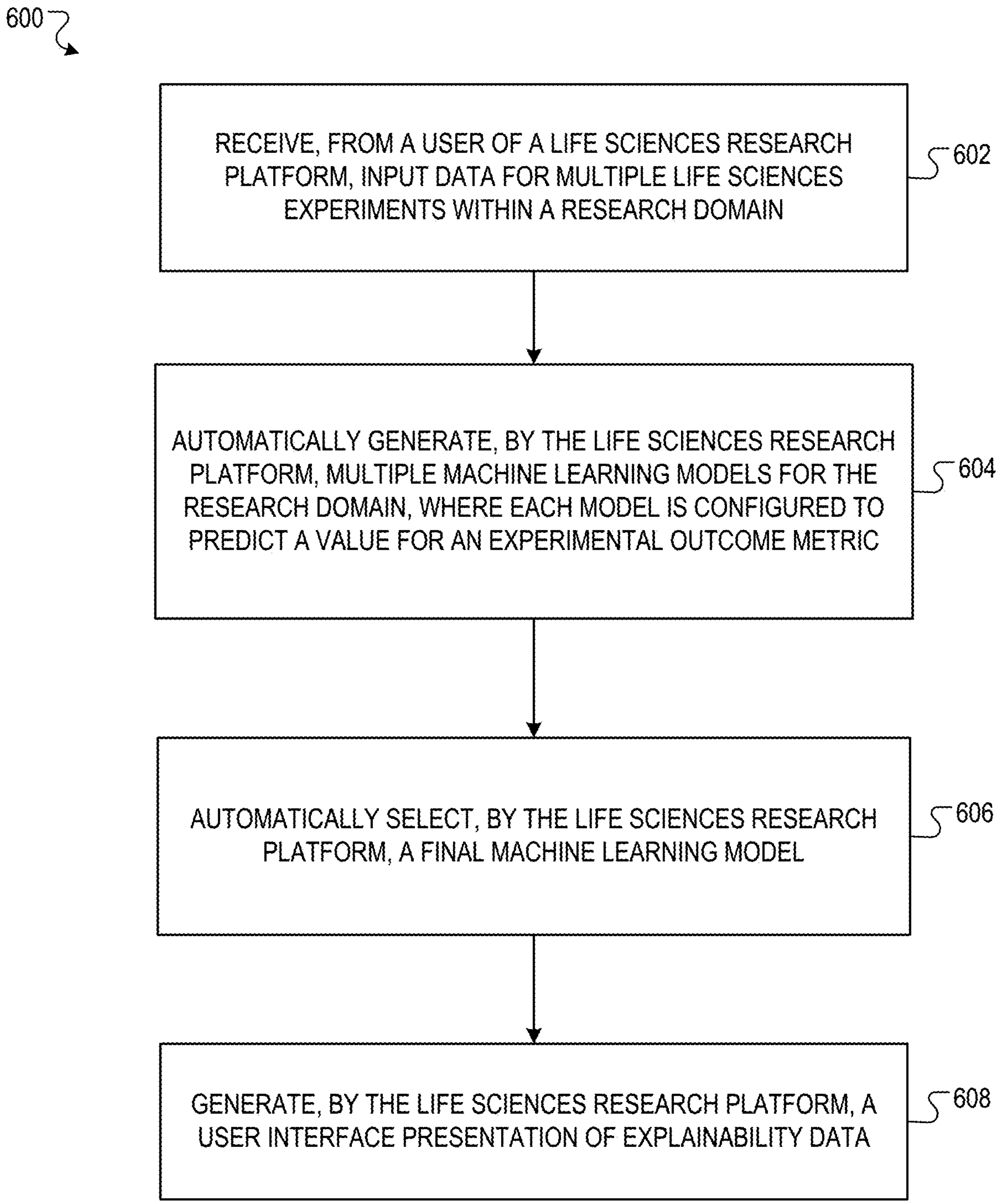
FIG. 6 is a flow diagram of an example process for generating a user interface presentation of explainability data by a life sciences research platform.

FIG. 6 is a flow diagram of an example process 600 for generating a user interface presentation of explainability data (e.g., presentation 400 in FIG. 4 and presentation 500 in FIG. 5). For convenience, the process 600 is described as being performed by a system of one or more computers located in one or more locations. For example, a life sciences research platform, e.g., the research platform 100 of FIG. 1, appropriately programmed in accordance with this specification, can perform the process 600.

The system receives, from a user, input data for multiple life sciences experiments within a research domain (602). The input data can include, for each life sciences experiment: (i) a collection of settings associated with the life sciences experiments, (ii) a respective input value for each setting of the collection of settings, and (iii) a respective empirical value for an experimental outcome metric. In some cases, the input data can represent results obtained from real-world life sciences experiments.

In some implementations, the system can generate a user interface presentation of the input data, e.g., as described above with reference to FIG. 2. The system can generate, in the user interface presentation, a table for each life sciences experiment. Each table can specify, e.g., (i) an identification number of the life sciences experiment, and (ii) the empirical value of the experimental outcome metric for the life sciences experiment. In some cases, the system can also present, in the user interface presentation, a column user interface control. Then the system can receive, from the user, a column selection through the column user interface control.

The system automatically generates multiple machine learning models for the research domain (604). As described above with reference to FIG. 3, each machine learning model can be configured to predict a value for the experimental outcome metric. For each machine learning model the system can train a candidate machine learning model from the collection of settings associated with each life sciences experiment. Then, the system can determine a performance measure for the candidate machine learning model based on how well the candidate machine learning model predicts the empirical value for the experimental outcome metric. In some cases, the machine learning models for the research domain include different machine learning model types. As a particular example, the machine learning model types can include, e.g., linear regression models, logistic regression models, Bayes classifier models, random classifier models, decision tree models, neural network models, or any other appropriate machine learning models. In some cases, the system can select the machine learning models from a model library (e.g., included in the model database 180 in FIG. 1) that is specific to the research domain specified in the input data.

In some implementations, as described above with reference to FIG. 3, the system can automatically generate multiple machine learning models using hyperparameter settings. For example, the system can obtain hyperparameter settings for the research domain specified in the input data. Then, for each machine learning model within the research domain, the system can train the candidate machine learning model from the collection of settings associated with each life sciences experiment and the hyperparameter settings to predict the value for the experimental outcome metric.

In some implementations, the input data can further include one or more constraints associated with the life sciences experiments. In such cases, the system can automatically generate multiple machine learning models for the research domain by training each candidate machine learning model from the collection of settings associated with each life sciences experiment and the one or more constraints.

The system automatically selects a final machine learning model from multiple machine learning models within the research domain (606). For example, the system can select the final machine learning model based on the performance measures of the candidate machine learning models. In some cases, the system can select the candidate machine learning model from multiple machine learning models having the highest performance measure. In some cases, the system can select the final machine learning model based on the performance measure and a constraint satisfaction metric that predicts how well the life sciences experiments satisfies one or more constraints specified in the input data.

The system generates a user interface presentation of explainability data (608). As described in more detail above with reference to FIG. 4 and FIG. 5, the explainability data can explain a contribution of each setting in the collection of settings to the value for the experimental outcome metric predicted by the final machine learning model. In some cases, the system can determine, for each setting in the collection of settings, a contribution score that characterizes a contribution of the setting to the value for the experimental outcome metric, e.g., using a SHAP technique or any other appropriate feature importance technique. Then, the system can generate, in the user interface presentation, a visualization that compares the respective contribution scores of the collection of settings. In some cases, the system can also generate, for each setting in the collection of settings, a visualization that compares different input values for the setting and respective contribution scores.

In some implementations, the system can receive new input data for a proposed life sciences experiment within the research domain. The data can include, e.g., a respective new input value for each setting of the collection of settings.

The system can use the final machine learning model and the respective new input value for each setting in the collection of settings to predict a new value for the experimental outcome metric. Then, the system can present the new value for the experimental outcome metric in the user interface presentation of the life sciences research platform. In some cases, the system can use the final machine learning model and the new value for the experimental outcome metric to generate new explainability data, and generate one or more visualizations of the new explainability data in the user interface presentation.

In some implementations, the system can receive, from one or more other users, input data for the life sciences experiments within the research domain. Then, the system can automatically select the final machine learning model from multiple machine learning models within the research domain for each of the one or more other users, e.g., in a similar way as described above with reference to FIG. 3.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:

receiving, from a user of a life sciences research platform comprising a plurality of computers, input data for a plurality of life sciences experiments within a research domain, the input data comprising, for each life sciences experiment:

(i) a collection of settings associated with the life sciences experiments, (ii) a respective input value for each setting of the collection of settings, wherein the respective input value characterizes a respective experimental condition for the life sciences experiment, and (iii) a respective empirical value for an experimental outcome metric for the research domain;

automatically generating, by the life sciences research platform, a plurality of machine learning models for the research domain, wherein each machine learning model is configured to predict a value for the experimental outcome metric, comprising, for each machine learning model of the plurality of machine learning models within the research domain:

training a candidate machine learning model from the collection of settings associated with the life sciences experiments; and determining a performance measure for the candidate machine learning model based on a discrepancy between the respective predicted empirical value of the candidate machine learning model and a target output empirical value for the experimental outcome metric;

automatically selecting, by the life sciences research platform, a final machine learning model from the plurality of machine learning models within the research domain based on the performance measures of the candidate machine learning models; and generating, by the life sciences research platform, a user interface presentation that is configured for querying potential experimental setups comprising respective input values for each setting in the collection of settings using the final machine learning model and that provides explainability data comprising contribution scores of the respective input values for each setting in the collection of settings to the value for the experimental outcome metric predicted by the final machine learning model, wherein the life sciences research platform generates a revised potential experimental setup that can improve the experimental outcome metric by modifying at least one input value of the potential experimental setups to indicate, based on the contribution scores, how the experimental outcome metric varies with different input values for a particular setting.

2. The method of claim 1, wherein the plurality of machine learning models for the research domain include different machine learning model types.

3. The method of claim 1, wherein the plurality of machine learning model types include one or more of: linear regression models, logistic regression models, Bayes classifier models, random classifier models, decision tree models, and neural network models.

4. The method of claim 1, wherein the plurality of machine learning models for the research domain are selected from a model library that is specific to the research domain specified in the input data.

5. The method of claim 1, further comprising:

receiving new input data for a proposed life sciences experiment within the research domain that comprises a respective new input value for each setting of the collection of settings;

using the final machine learning model and the respective new input value for each setting in the collection of settings to predict a new value for the experimental outcome metric; and presenting the new value for the experimental outcome metric in the user interface presentation of the life sciences research platform.

6. The method of claim 1, wherein automatically generating, by the life sciences research platform, the plurality of machine learning models for the research domain further comprises:

obtaining a plurality of hyperparameter settings for the research domain specified in the input data; and for each machine learning model of the plurality of machine learning models within the research domain:

training the candidate machine learning model from the collection of settings associated with each life sciences experiment and the plurality of hyperparameter settings to predict the value for the experimental outcome metric.

7. The method of claim 1, wherein the input data for the plurality of life sciences experiments within the research domain represents results obtained from real-world life sciences experiments.

8. The method of claim 1, further comprising:

receiving, from one or more other users of the life sciences research platform, input data for the plurality of life sciences experiments within the research domain; and automatically selecting the final machine learning model from the plurality of machine learning models within the research domain for each of the one or more other users.

9. The method of claim 1, wherein the input data further comprises one or more constraints associated with the plurality of life sciences experiments, and wherein automatically generating the plurality of machine learning models for the research domain further comprises, for each machine learning model of the plurality of machine learning models within the research domain:

training the candidate machine learning model from the collection of settings associated with each life sciences experiment and the one or more constraints.

10. The method of claim 1, wherein automatically selecting the final machine learning model from the plurality of machine learning models within the research domain based on the performance measures of the candidate machine learning models comprises:

automatically selecting the candidate machine learning model from the plurality of machine learning models having the highest performance measure.

11. The method of claim 1, wherein receiving, from the user of the life sciences research platform, input data for the plurality of life sciences experiments within the research domain, comprises:

generating, in the user interface presentation of the life sciences research platform, a table for each life sciences experiment, wherein each table specifies:

(i) an identification number of the life sciences experiment, and (ii) the empirical value of the experimental outcome metric for the life sciences experiment.

12. The method of claim 11, wherein generating, in the user interface presentation of the life sciences research platform, the table for each life sciences experiment, comprises:

presenting, in the user interface presentation of the life sciences research platform, a column user interface control; and receiving, from the user of the life sciences research platform, a column selection through the column user interface control.

13. The method of claim 1, wherein generating, by the life sciences research platform, the user interface presentation of explainability data comprising a contribution of respective input values for each setting in the collection of settings to the value for the experimental outcome metric predicted by the final machine learning model comprises:

determining, for each setting in the collection of settings, a contribution score that characterizes a contribution of the setting to the value for the experimental outcome metric; and generating, in the user interface presentation, a visualization that compares the respective contribution scores of the collection of settings.

14. The method of claim 13, further comprising:

generating, by the life sciences research platform and for each setting in the collection of settings, a visualization that compares different input values for the setting and respective contribution scores.

15. The method of claim 1, wherein the user interface presentation comprises a graph that specifies the contribution of the respective input values for each setting in the collection of settings to the value for the experimental outcome metric predicted by the final machine learning model.

16. A system comprising:

one or more computers; and one or more storage devices communicatively coupled to the one or more computers, wherein the one or more storage devices store instructions that, when executed by the one or more computers, cause the one or more computers to perform operations comprising:

receiving, from a user of a life sciences research platform comprising a plurality of computers, input data for a plurality of life sciences experiments within a research domain, the input data comprising, for each life sciences experiment:

(i) a collection of settings associated with the life sciences experiments, (ii) a respective input value for each setting of the collection of settings, wherein the respective input value characterizes a respective experimental condition for the life sciences experiment, and (iii) a respective empirical value for an experimental outcome metric for the research domain;

automatically generating, by the life sciences research platform, a plurality of machine learning models for the research domain, wherein each machine learning model is configured to predict a value for the experimental outcome metric, comprising, for each machine learning model of the plurality of machine learning models within the research domain:

training a candidate machine learning model from the collection of settings associated with the life sciences experiments; and determining a performance measure for the candidate machine learning model based on a discrepancy between the respective predicted empirical value of the candidate machine learning model and a target output empirical value for the experimental outcome metric;

automatically selecting, by the life sciences research platform, a final machine learning model from the plurality of machine learning models within the research domain based on the performance measures of the candidate machine learning models; and generating, by the life sciences research platform, a user interface presentation that is configured for querying potential experimental setups comprising respective input values for each setting in the collection of settings using the final machine learning model and that provides explainability data comprising contribution scores of the respective input values for each setting in the collection of settings to the value for the experimental outcome metric predicted by the final machine learning model, wherein the life sciences research platform generates a revised potential experimental setup that can improve the experimental outcome metric by modifying at least one input value of the potential experimental setups to indicate, based on the contribution scores, how the experimental outcome metric varies with different input values for a particular setting.

17. The system of claim 16, wherein generating, by the life sciences research platform, the user interface presentation of explainability data comprising a contribution of respective input values for each setting in the collection of settings to the value for the experimental outcome metric predicted by the final machine learning model comprises:

determining, for each setting in the collection of settings, a contribution score that characterizes a contribution of the setting to the value for the experimental outcome metric; and generating, in the user interface presentation, a visualization that compares the respective contribution scores of the collection of settings.

18. The system of claim 17, further comprising:

generating, by the life sciences research platform and for each setting in the collection of settings, a visualization that compares different input values for the setting and respective contribution scores.

19. One or more non-transitory computer storage media storing instructions that when executed by one or more computers cause the one or more computers to perform operations comprising:

receiving, from a user of a life sciences research platform comprising a plurality of computers, input data for a plurality of life sciences experiments within a research domain, the input data comprising, for each life sciences experiment:

(i) a collection of settings associated with the life sciences experiments, (ii) a respective input value for each setting of the collection of settings, wherein the respective input value characterizes a respective experimental condition for the life sciences experiment, and (iii) a respective empirical value for an experimental outcome metric for the research domain;

automatically generating, by the life sciences research platform, a plurality of machine learning models for the research domain, wherein each machine learning model is configured to predict a value for the experimental outcome metric, comprising, for each machine learning model of the plurality of machine learning models within the research domain:

training a candidate machine learning model from the collection of settings associated with the life sciences experiments; and determining a performance measure for the candidate machine learning model based on a discrepancy between the respective predicted empirical value of the candidate machine learning model and a target output empirical value for the experimental outcome metric;

automatically selecting, by the life sciences research platform, a final machine learning model from the plurality of machine learning models within the research domain based on the performance measures of the candidate machine learning models; and generating, by the life sciences research platform, a user interface presentation that is configured for querying potential experimental setups comprising respective input values for each setting in the collection of settings using the final machine learning model and that provides explainability data comprising contribution scores of the respective input values for each setting in the collection of settings to the value for the experimental outcome metric predicted by the final machine learning model, wherein the life sciences research platform generates a revised potential experimental setup that can improve the experimental outcome metric by modifying at least one input value of the potential experimental setups to indicate, based on the contribution scores, how the experimental outcome metric varies with different input values for a particular setting.

20. The non-transitory computer storage media of claim 19, wherein generating, by the life sciences research platform, the user interface presentation of explainability data comprising a contribution of respective input values for each setting in the collection of settings to the value for the experimental outcome metric predicted by the final machine learning model comprises:

determining, for each setting in the collection of settings, a contribution score that characterizes a contribution of the setting to the value for the experimental outcome metric; and generating, in the user interface presentation, a visualization that compares the respective contribution scores of the collection of settings.

21. The non-transitory computer storage media of claim 20, further comprising:

generating, by the life sciences research platform and for each setting in the collection of settings, a visualization that compares different input values for the setting and respective contribution scores.

* * * * *